(12) United States Patent
Ishibashi et al.

(10) Patent No.: US 6,638,356 B2
(45) Date of Patent: Oct. 28, 2003

(54) GYPSUM-BASED BUILDING MATERIAL

(75) Inventors: Yoshiaki Ishibashi, Kawasaki (JP);
Itaru Yokoyama, Tokyo (JP);
Masanobu Seki, Tokyo (JP)

(73) Assignees: Kawasaki Kasei Chemicals Ltd., Tokyo (JP); Yoshino Gypsum Co., Ltd., Tokyo (JP)

( * ) Notice: Subject to any disclaimer, the term of this patent is extended or adjusted under 35 U.S.C. 154(b) by 0 days.

(21) Appl. No.: 10/067,949

(22) Filed: Feb. 8, 2002

(65) Prior Publication Data

US 2003/0150363 A1 Aug. 14, 2003

(51) Int. Cl.⁷ ............... C04B 24/00; C04B 28/14; C04B 11/00; E04C 2/04; E04B 1/92
(52) U.S. Cl. ............ 106/781; 106/778; 428/688; 435/262
(58) Field of Search .............. 106/778, 781; 435/262; 428/688

(56) References Cited

U.S. PATENT DOCUMENTS

| 5,385,842 A | | 1/1995 | Weimer et al. ............ 435/262 |
| 5,401,798 A | * | 3/1995 | Rasp et al. ............... 524/423 |
| 5,500,368 A | | 3/1996 | Tatnall ..................... 435/262 |

OTHER PUBLICATIONS

Derwent Abstract No. 1983–843082, abstract of Soviet Union Patent Specification No. 996379 (Feb. 1983).*
Derwent Abstract No. 1986–304125, abstract of Soviet Union Patent Specification No. 1222650 (Mar. 1986).*

* cited by examiner

Primary Examiner—Anthony J. Green
(74) Attorney, Agent, or Firm—Oblon, Spivak, McClelland, Maier & Neustadt, P.C.

(57) ABSTRACT

A gypsum-based building material comprising gypsum as the main material and an anthraquinone compound incorporated.

16 Claims, No Drawings

GYPSUM-BASED BUILDING MATERIAL

BACKGROUND OF THE INVENTION

1. Field of the Invention

The present invention relates to a gypsum-based building material which has an ability to suppress generation of hydrogen sulfide caused by decomposition of an organic material as disposed. More particularly, it relates to a gypsum-based building material which suppresses, over a long period of time, generation of hydrogen sulfide by the action of sulfate-reducing bacteria, when it is landfilled as waste.

2. Discussion of Background

In recent years, along with shortage of landfill sites of waste and increase of landfill costs, there have been illegal dumping of industrial wastes such as building material wastes in suburbs, or organic sludges, waste materials and combustible wastes which should not be brought in least controlled landfill sites have been disposed in such a state as mixed with items permitted to least controlled landfill sites. At such sites, hazardous hydrogen sulfide is often generated, which creates a social problem. This is caused in such a manner that a sulfide (sulfide ions) formed by reduction of sulfuric acid ions by sulfate-reducing bacteria, tend to be dispersed as hydrogen sulfide in the atmospheric air.

It is generally known that as conditions for generation of hydrogen sulfide at landfill sites, in the presence of ①water, ② an organic substance, ③ sulfate ions and ④ sulfate-reducing bacteria, it is necessary to maintain ⑤ anaerobic condition, ⑥ pH=4 to 9, and ⑦ a proper temperature, and hydrogen sulfide will be generated only when all of these conditions are met.

Gypsum-based building materials, particularly gypsum boards, are used in a large quantity as interior materials of buildings because of their convenience. While a recycling route is established for discard materials at the time of new construction, recycling of waste materials at the time of demolition has just been started, and most of such waste materials are still dumped together with other building waste materials at landfill sites.

Properly disposed gypsum board waste materials will not create any problem. However, if at a landfill site, in addition to the above gypsum board waste materials, a large amount of organic materials which should not be brought in, are dumped, and the above-mentioned conditions are all met, gypsum as the main component of the gypsum boards, i.e. calcium sulfate, will serve as a supply source of sulfate ions and thus will cause generation of hydrogen sulfide for a long period of time.

Such hydrogen sulfide is formed in a metabolic process wherein sulfate-reducing bacteria active in an anaerobic condition utilizes an organic substance such as lactic acid as an electron donor and finally donates electrons to a sulfate to acquire an energy. Heretofore, 5 various methods have been proposed to suppress generation of hydrogen sulfide caused by such an action of sulfate-reducing bacteria.

For example, utilization of inorganic compounds such as nitrates, nitrites or iron sulfate (JP-A-10-85785, JP-A-11-206863), utilization of various antibacterial or antibiotic substances, or dyes (JP-A-63-209798, JP-A-1-268603, JP-A-3-10394), etc., may be mentioned.

Further, recently, a method of employing anthraquinones to inhibit sulfide production by sulfate-reducing bacteria, has been proposed (Japanese Patent 2,858,480, Japanese Patent 2,837,620, JP-A-2000-34202). It is considered that anthraquinones are reduced to anthrahydroquinones by microorganisms living under an anaerobic condition and penetrate into cell membranes of sulfate-reducing bacteria, whereupon they are oxidized to anthraquinones again and then inhibit the sulfate respiration metabolism, whereby formation of a sulfide is suppressed (Journal of Sewerage Monthly, No. 22, Vol. 6, p. 73).

Among the above methods, for example, use of nitrates or nitrites has an environmental problem, and iron sulfate has a possibility that depending upon the conditions, it itself becomes a supply source of sulfate ions. Further, these compounds are water-soluble and are likely to easily elute once substitution of water takes place due to e.g. rainfall at landfill sites. Accordingly, in order to maintain the effect for suppressing generation of hydrogen sulfide, it has been necessary to take a trouble of periodically additionally supplying such compounds. On the other hand, the method of employing anthraquinone compounds to suppress generation of hydrogen sulfide, is economical in that a long lasting effect can be obtained with a small amount, but commercially available anthraquinone compounds are usually in the form of a fine powder, and if such compounds are applied to landfill sites, the anthraquinone compounds will gradually flow out by e.g. rainfall, and periodical application has been required in order to maintain the effect.

Under these circumstances, it has been desired to develop a gypsum-based building material having an ability to suppress generation of hydrogen sulfide over a long period of time without periodical addition of a chemical agent, even when it is landfilled together with a large amount of organic substances.

SUMMARY OF THE INVENTION

Under these circumstances, the present invention has been made for the purpose of providing a gypsum-based building material which is capable of suppressing generation of hydrogen sulfide for a long period of time even when the gypsum-based building material is disposed or landfilled together with an organic substance.

The above object can be accomplished by a gypsum-based building material comprising gypsum as the main material and an anthraquinone compound incorporated.

DETAILED DESCRIPTION OF THE PREFERRED EMBODIMENTS

Now, the present invention will be described in detail with reference to the preferred embodiments.

Under the above described circumstances, the present inventors have conducted an extensive study and as a result, have found that when an anthraquinone compound is incorporated in a certain amount to gypsum as the main material, such a gypsum-based building material has an ability to suppress generation of hydrogen sulfide over a long period of time even when all of the above-mentioned conditions for generation of hydrogen sulfide, are met. The anthraquinone compound has low solubility and is a compound which has no problem in safety by itself. With the gypsum-based building material prepared by incorporating an anthraquinone compound, the anthraquinone compound will be uniformly embedded among needle crystals when gypsum as the main material cures, and accordingly, when the gypsum is gradually dissolved in an anaerobic environment, a constant amount of the anthraquinone compound will also be always dissolved, whereby the effect will be remained over a long period of time as compared with a case where the anthraquinone compound was merely applied to a gypsum-based building material.

The anthraquinone compound to be used in the present invention is an anthraquinone represented by the structure (A) and may be any compound so long as it shows the effect of inhibiting sulfide production by sulfate-reducing bacteria.

Structure (A)

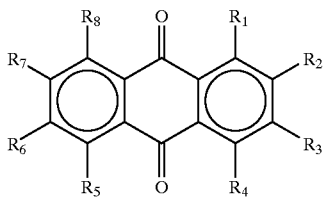

wherein each of $R_1$ to $R_8$ which are independent of one another, is a hydrogen atom, an alkyl group, an alkoxy group, a hydroxyl group, a halogen atom, a carboxyl group, a sulfo group or an amino group.

Here, the alkyl group may, for example, be an alkyl group such as a methyl group, an ethyl group, a n-propyl group, an i-propyl group, a n-butyl group, a t-butyl group, a n-pentyl group or a n-hexyl group, more preferably a $C_1$–$C_6$ alkyl group. The alkoxy group may, for example, be an alkoxy group such as a methoxy group, an ethoxy group, a n-propoxy group, a n-butoxy group, a t-butoxy group, a n-pentyloxy group or a n-hexyloxy group, more preferably a $C_1$–$C_6$ alkoxy group. Further, the halogen atom may, for example, be a fluorine atom, a chlorine atom or a bromine atom.

As a specific compound, anthraquinone (9,10-anthraquinone), 1-methylanthraquinone, 2-methylanthraquinone, 2-ethylanthraquinone, 1-methoxyanthraquinone, 1-methoxy-4-methylanthraquinone, 1-hydroxyanthraquinone, 1,2-dihydroxyanthraquinone, 1,4-dihydroxyanthraquinone, 1,5-dihydroxyanthraquinone, 1,8-dihydroxyanthraquinone, 2,6-dihydroxyanthraquinone, 1-chloroanthraquinone, 2-chloroanthraquinone, 1,5-dichloroanthraquinone, 1,3-dibromoanthraquinone, anthraquinone-1-carboxylic acid, anthraquinone-2-carboxylic acid, 2-chloroanthraquinone-3-carboxylic acid, anthraquinone-2-sulfonic acid, 1-aminoanthraquinone, 2-aminoanthraquinone, 1,4-diaminoanthraquinone, or 1-amino-4-hydroxyanthraquinone, may, for example, be mentioned.

Further, the anthraquinone compound of the present invention includes anthrahydroquinones corresponding to the anthraquinones shown by the above structural formula (A). As a specific compound, anthrahydroquinone (9,10-anthracenediol), 1-methylanthrahydroquinone or 2-ethylanthrahydroquinone, may be mentioned. Further, such anthrahydroquinones include their alkali metal salts such as sodium salts. As a specific compound, a sodium salt (mono- or di-) of anthrahydroquinone may be mentioned.

Further, the anthraquinone compound of the present invention includes a dihydroanthraquinone compound, a tetrahydroanthraquinone compound and an octahydroanthraquinone compound corresponding to nucleus hydrogenated products of anthraquinones of the above structural formula (A). A specific compound may be 1,4-dihydroanthraquinone or 1,4,4a,9a-tetrahydroanthraquinone. Further, such nucleus hydrogenated products include tautomers and alkali metal salts. A specific compound may be a sodium salt (mono- or di-) of 1,4-dihydro-9,10-dihydroxyanthracene or 1,4-dihydro-9,10-hydroxyanthracene.

Among these anthraquinone compounds, anthraquinone is particularly preferred, since it is industrially readily available, and anthrahydroquinone as its reduction product, can easily be prepared by means of a reducing agent such as hydrosulfite. Of course, two or more of these anthraquinone compounds may be mixed for use.

The method of incorporating the anthraquinone compound of the present invention to the gypsum as the main material, is not particularly limited. It may be added to the gypsum in the form of a powder itself or in the state of an aqueous slurry, or it may be added in the form of an aqueous solution of the above-mentioned alkali metal salt or in the form of an organic solvent solution of an anthraquinone.

By such a method, the anthraquinone compound can be incorporated more uniformly. For example, gypsum is mixed with an aqueous solution of a disodium salt of anthraquinone or a disodium salt of 1,4-dihydro-9,10-hydroxyanthracene, followed by oxidation treatment or the like to precipitate anthraquinone, whereby the anthraquinone compound can be incorporated in the form of fine crystals.

The anthraquinone compound may be incorporated to gypsum not only in the above-mentioned form, but may preliminarily be mixed with an admixture as shown below and may be added to gypsum in a kneaded state or in a coated state. Further, it may preliminarily be incorporated to a raw material gypsum such as natural gypsum, desulfogypsum or phosphogypsum, which is independently commercialized and used for the production of cement or such a gypsum-based building material. Further, in the case of one having a surface material such as a lining paper for gypsum board on its surface, such as a gypsum board, the anthraquinone compound may be incorporated to the surface material.

The amount of the anthraquinone compound to be used in the present invention is usually from 0.005 to 5 parts by weight, preferably from 0.01 to 3 parts by weight, more preferably from 0.01 to 1 part by weight, per 100 parts by weight of gypsum. Such an anthraquinone compound has a higher effect for suppressing generation of hydrogen sulfide, as its amount increases. However, even if it is incorporated beyond 5 parts by weight, such tends to be costly disadvantageous, as compared with the above suppression effect. On the other hand, if the amount is less than 0.005 part by weight, no adequate effect for suppression can be obtained. The gypsum-based building material of the present invention thus obtained will exhibit the effect for suppressing generation of hydrogen sulfide over a long period of time against sulfate-reducing bacteria having an ability to reduce a sulfate, irrespective of the genus or species of the bacteria. For example, it is useful against those disclosed in "Journal of Water and Waste" No. 31, Vol. 4, p. 294–305 (1989). Typical bacteria include species belonging to genus Desulfovibrio such as *Desulfovibrio desulfuricans*, genus Desulfobacter such as *Desulfobacter postgatei*, and other genus such as genus Desulfobulbus, genus Desulfococcus, *Desulfonema limicola*, genus Desulfonema, genus Desulfosalcina, genus Desulfomonus, and genus Desulfotomacrum.

The gypsum-based building material of the present invention may be not only one formed into a plate shape using gypsum as the main material, such as a gypsum board, a gypsum sheathing board, a reinforced gypsum board, a gypsum lath board, a decorated gypsum board or a non-combustible laminated gypsum board, as defined in JIS A6901-1997, and a perforated gypsum board for acoustic use or a non-woven glass fiber-filled gypsum plate, as defined in JIS A6301, but also a powdery, paste or slurry building material using gypsum as the main material, such as a SL plaster, or a gypsum plaster or gypsum-based putty, as defined in JIS A6904-1997.

The above gypsum boards can be produced by a usual gypsum board production line. It is one obtained by adding a known admixture such as pulp fiber and/or glass fiber, a known defoaming agent, setting modifier, adhesion-increasing agent, etc. to β-type hemihydrate gypsum, α-type hemihydrate gypsum or a mixture thereof, as the main material, as the case requires.

Further, the gypsum plaster, the gypsum-based putty, etc., of the present invention can likewise be produced by usual production apparatus for gypsum plasters, gypsum-based putties, etc., and they are ones obtained by adding known light weight aggregates such as pearlite or vermiculite, and a known viscosity-adjusting agent, setting modifier or the like to β-type hemihydrate gypsum, α-type hemihydrate gypsum or a mixture thereof, as the case requires.

With respect to any one of building materials, the anthraquinone compound can be incorporated by the above method of addition in the respective process for its production, and the anthraquinone compound can be uniformly embedded in the gypsum, while the gypsum as the main material and the anthraquinone compound will not present any adverse effect to the gypsum itself during the production, or without creating any problem in the production line of the gypsum-based building material. Further, the term "addition" used in this specification is meant for one form of incorporation.

Now, the present invention will be described in further detail with reference to Examples and Comparative Examples. Here, reference is made to a gypsum board, but the present invention is by no means thereby restricted, and products using gypsum as the main material such as gypsum plasters and gypsum putties, exhibit similar natures as wastes, and similar effects by the present invention can be obtained.

EXAMPLES 1 to 3

As the anthraquinone compound, 9,10-anthraquinone (reagent manufactured by Kanto Kagaku K.K.) was used. As shown in Table 1, gypsum boards having a thickness of 12.5 mm and a specific gravity of 0.70 were produced by a usual gypsum board production line by changing the amount of 9,10-anthraquinone to 0.01 part by weight, 0.1 part by weight and 1.0 part by weight, per 100 parts by weight of gypsum. These gypsum board samples were respectively roughly crushed to a size of about 1 cm×1 cm×1 cm and used as test pieces for hydrogen sulfide generation tests (pre-addition of anthraquinone).

COMPARATIVE EXAMPLES 1 to 4

Gypsum boards having a thickness of 12.5 mm and a specific gravity of 0.70 were produced by a usual gypsum board production line without adding 9,10-anthraquinone. In the same manner as the Examples, this gypsum board sample was roughly crushed to a size of about 1 cm×1 cm×1 cm, whereupon 1,000 g was taken, and as shown in Table 1, 9,10-anthraquinone was added by changing the amount to 0.01 part by weight, 0.1 part by weight and 1.0 part by weight, per 100 parts by weight of gypsum. Then, they were put into a polyethylene bag and thoroughly mixed to obtain test samples of Comparative Examples 1 to 3 (post addition of anthraquinone).

Further, a test piece having no 9,10-anthraquinone added was likewise prepared, and as Comparative Example 4, hydrogen sulfide generation tests were carried out.

With respect to a total of seven types of gypsum boards of Examples 1 to 3 and Comparative Examples 1 to 4, the following tests were carried out.

Preparation of Raw Garbage 200 ml of deionized water was added to 200 g of raw garbage from a kitchen, having a foul water (containing cooked rice, pork, cabbages and eggs), followed by shredding by means of a household mixer for juice (MX-V100, manufactured by Matsushita Electric Co., Ltd.) to obtain a raw garbage slurry as an organic source. When this garbage was left to stand together with a gypsum board in a closed container containing deionized water, in the method as described hereinafter, the concentration of hydrogen sulfide in the gas phase section in the container became a few ppm upon expiration of 3 days, whereby it was confirmed that sulfate-reducing bacteria were propagated in a sufficient number for this test. The test takes a long time. Accordingly, at the initiation of every test, a raw garbage slurry having substantially the same composition was prepared, and it was confirmed that in each slurry, sulfate-reducing bacteria were propagated to substantially the same level.

Hydrogen Sulfide Generation Test (Initial Test)

2 g of this raw garbage slurry and 20 g of the above gypsum board sample were put into a 300 ml plastic container, and 200 ml of deionized water was added thereto. A cover was put to seal the container, which was left to stand for 14 days in a constant temperature chamber of 40° C., whereupon the container was sufficiently shaken, and then the concentration of hydrogen sulfide in the upper portion in the closed container was measured by a gas detection tube GV-100S, manufactured by Gastec Co., Ltd. The concentration of hydrogen sulfide was compared. The results are shown in Table 1.

Repeating Test of Hydrogen Sulfide Generation
(First Time)

After completion of the measurement of the hydrogen sulfide concentration, the above closed container was vigorously shaken to suspend the content, and then left to naturally settle for 3 minutes, whereupon about 180 ml of the supernatant only was discarded. To this container, 2 g of the above raw garbage slurry and 180 ml of deionized water were added anew, and a cover was put to seal the container, which was then left to stand still for 14 days in a constant chamber of 40° C., whereupon the container was sufficiently shaken, and then the concentration of hydrogen sulfide at an upper portion in the closed container was measured by a gas detector tube GV-100S, manufactured by Gastec Co., Ltd. The concentration of hydrogen sulfide was compared. The results are shown in Table 1.

Repeating Test of Hydrogen Sulfide Generation
(Second Time)

After completion of the repetition test of the first time, the closed container was treated in the same procedure as in the repetition test of the first time, and upon expiration of further 14 days, the concentration of hydrogen sulfide at the upper portion in the closed container was measured. The results are shown in Table 1.

Repeating Test of Hydrogen Sulfide Generation
(Third Time)

After completion of the repeating test of the second time, the closed container was treated in the same procedure as in the repeating tests of the first and second times, and upon expiration of further 14 days, the concentration of hydrogen sulfide at the upper portion in the closed container, was measured. The results are shown in Table 1.

TABLE 1

| | Anthraquinone (parts by weight) | Addition method | Hydrogensulfide concentration upon expiration of 14 days (ppm) | | | |
|---|---|---|---|---|---|---|
| | | | Initial test | Repeating test (1st time) | Repeating test (2nd time) | Repeating test (3rd time) |
| Example 1 | 0.01 | Pre | 2.8 | 2.2 | 3.2 | 2.0 |
| Example 2 | 0.1 | Pre | 0.6 | 1.2 | 1.6 | 0.6 |
| Example 3 | 1.0 | Pre | 0 | 0.1 | 0.1 | 0 |
| Comparative Example 1 | 0.01 | Post | 1.8 | 800 | 5000 | 5000 |
| Comparative Example 2 | 0.1 | Post | 0.8 | 140 | 1700 | 3500 |
| Comparative Example 3 | 1.0 | Post | 0 | 18 | 650 | 1200 |
| Comparative Example 4 | 0 | — | 7000 | 6000 | 6000 | 5000 |

Note)
Addition method
Pre: A gypsum board prepared by having anthraquinone preliminarily added, was used.
Post: To a usual gypsum board, anthraquinone was post-added.

As is evident from the results shown in Table 1, when the raw garbage was added to the gypsum board test piece having no 9,10-anthraquinone added, a large amount of hydrogen sulfide was generated in all tests Comparative Example 4

With the gypsum board test pieces of Comparative Examples 1 to 3 having 9,10-anthraquinone merely added, the effect for suppressing the generation of hydrogen sulfide was observed after the initial test, but the effect decreased substantially as the repeating test was carried out for the first time, the second time and the third time.

Whereas, the gypsum board test pieces of the present invention (Examples 1 to 3) continued to maintain the effect for suppressing generation of hydrogen sulfide, even when the repeating test was carried out for the first, second and third times.

The above results indicates that even if the gypsum board of the present invention is landfilled together with a large amount of an organic substance at a landfill site, it continues to maintain the effect for suppressing generation of hydrogen sulfide over a long period of time.

On the other hand, it indicates that when an anthraquinone compound is post-added i.e. if the anthraquinone compound is added at the time of landfilling a usual gypsum board at the landfill site, although there may be the effect for suppressing generation of hydrogen sulfide for a while, the fine anthraquinone compound tends to readily flow out by e.g. rainfall, and such a suppressing effect will be weakened in a short period of time.

The effect of the present invention is considered to be such that when the gypsum-based building material is produced by an addition of an anthraquinone compound, at the time of curing the gypsum as the main material, the anthraquinone compound will be embedded uniformly in crystals, and accordingly, when the gypsum will gradually dissolve, a certain amount of the anthraquinone compound is always dissolved and supplied, whereby the effect for suppressing generation of hydrogen sulfide, will be maintained over a long period of time.

From the foregoing, it has been found effective to incorporate an anthraquinone compound to gypsum as the main material at the time of the preparation of a gypsum-based building material, in order to impart to the gypsum-based building material an ability to suppress generation of hydrogen sulfide caused by decomposition of organic substances when the gypsum-based building material is landfilled together with the organic substances.

As described in the foregoing, according to the present invention, it is possible to obtain a gypsum-based building material such as a gypsum board, a gypsum plaster or a gypsum-based putty, having an ability to suppress generation of hydrogen sulfide caused by decomposition of organic substances, over a long period of time.

What is claimed is:

1. A gypsum-based board comprising 0.005 to 5 parts by weight of an anthraquinone compound per 100 parts by weight of gypsum, wherein the amount of anthraquinone compound is sufficient to suppress generation of hydrogen sulfide when the board is contacted with an organic material.

2. The gypsum-based board of claim 1, wherein the anthraquinone compound is incorporated into the gypsum.

3. The gypsum-based board of claim 1, wherein the anthraquinone compound is incorporated on a surface of the board.

4. The gypsum-based board of claim 1, which comprises 0.05 to 5 parts by weight of the anthraquinone compound per 100 parts by weight of gypsum.

5. The gypsum-based board of claim 1, which comprises 0.01 to 3 parts by weight of the anthraquinone compound per 100 parts by weight of gypsum.

6. The gypsum-based board of claim 1, which comprises 0.01 to 1 parts by weight of the anthraquinone compound per 100 parts by weight of gypsum.

7. The gypsum-based board of claim 1, wherein the anthraquinone compound is selected from the group consisting of anthraquinones, anthrahydroquinones, and nuclear hydrogenated anthraquinones.

8. The gypsum-based board of claim 1, which contains two or more anthraquinone compounds.

9. The gypsum-based board of claim 1, wherein the anthraquinone compound is anthraquinone or anthrahydroquinone.

10. The gypsum-based board of claim 1, wherein the board is a member selected from the group consisting of a gypsum board, a gypsum sheathing board, a reinforced gypsum board, a gypsum lath board, a decorated gypsum board, a non-combustible laminated gypsum board, a perforated gypsum board, and a non-woven glass fiber-filled gypsum plate.

11. The gypsum-based board of claim 1, wherein the anthraquinone compound is represented by the formula:

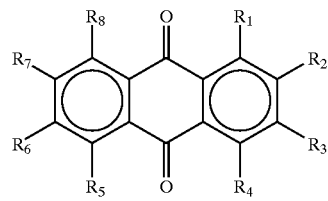

wherein each of $R_1$ to $R_8$ which are independent of one another, is a hydrogen atom, an alkyl group, an alkoxy group, a hydroxyl group, a halogen atom, a carboxyl group, a sulfo group, or an amino group.

12. The gypsum-based board of claim 11, wherein
each alkyl group is, independently, a member selected from the group consisting of a methyl group, an ethyl group, a n-propyl group, an i-propyl group, a n-butyl group, a t-butyl group, a n-pentyl group, and a n-hexyl group,
each alkoxy group is, independently, a member selected from the group consisting of a methoxy group, an ethoxy group, a n-propoxy group, a n-butoxy group, a t-butoxy group, a n-pentyloxy group, and a n-hexyloxy group, and
each halogen atom is, independently, a member selected from the group consisting of a fluorine atom, a chlorine atom, and a bromine atom.

13. The gypsum-based board of claim 1, wherein the anthraquinone compound is selected from the group consisting of anthraquinone (9,10-anthraquinone), 1-methylanthraquinone, 2-methylanthraquinone, 2-ethylanthraquinone, 1-methoxyanthraquinone, 1-methoxy-4-methylanthraquinone, 1-hydroxyanthraquinone, 1,2-dihydroxyanthraquinone, 1,4-dihydroxyanthraquinone, 1,5-dihydroxyanthraquinone, 1,8-dihydroxyanthraquinone, 2,6-dihydroxyanthraquinone, 1-chloroanthraquinone, 2-chloroanthraquinone, 1,5-dichloroanthraquinone, 1,3-dibromoanthraquinone, anthraquinone-1-carboxylic acid, anthraquinone-2-carboxylic acid, 2-chloroanthraquinone-3-carboxylic acid, anthraquinone-2-sulfonic acid, 1-aminoanthraquinone, 2-aminoanthraquinone, 1,4-diaminoanthraquinone, and 1-amino-4-hydroxyanthraquinone.

14. The gypsum-based board of claim 1, wherein the anthraquinone compound is selected from the group consisting of anthrahydroquinone (9,10-anthracenediol), 1-methylanthrahydroquinone, 2-ethylanthrahydroquinone, and a sodium salt (mono- or di-) of anthrahydroquinone.

15. The gypsum-based board of claim 1, wherein the anthraquinone compound is selected from the group consisting of a dihydroanthraquinone compound, a tetrahydroanthraquinone compound, and an octahydroanthraquinone compound.

16. The gypsum-based board of claim 1, wherein the anthraquinone compound is selected from the group consisting of 1,4-dihydroanthraquinone, 1,4,4a,9a-tetrahydroanthraquinone, and a sodium salt (mono- or di-) of 1,4-dihydro-9,10-dihydroxyanthracene or 1,4-dihydro-9,10-hydroxyanthracene.

* * * * *